UNITED STATES PATENT OFFICE.

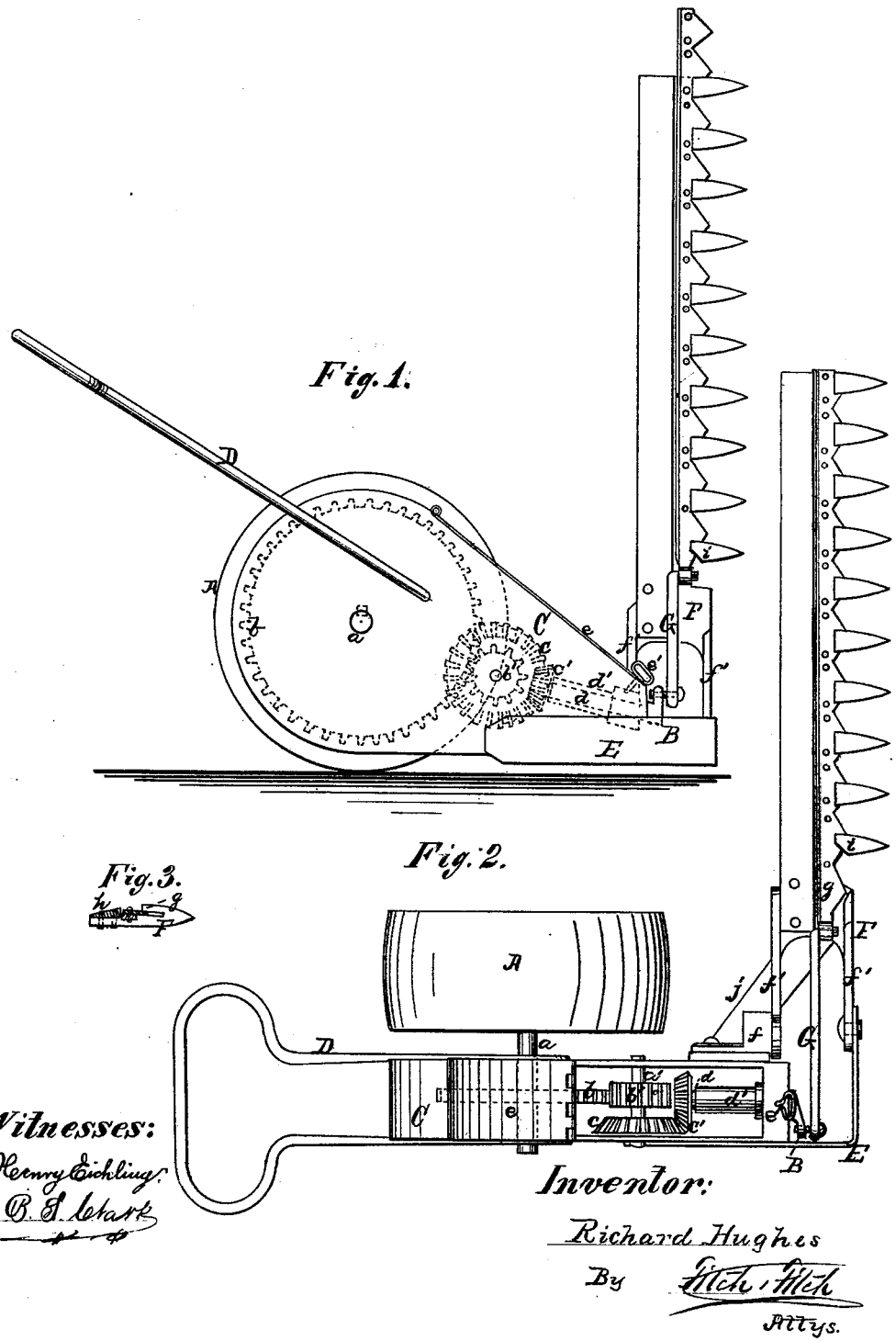

RICHARD HUGHES, OF MORRIS, ILLINOIS.

IMPROVEMENT IN LAWN-MOWERS.

Specification forming part of Letters Patent No. 180,768, dated August 8, 1876; application filed May 4, 1876.

*To all whom it may concern:*

Be it known that I, RICHARD HUGHES, of Morris, county of Grundy and State of Illinois, have invented an Improved Lawn-Mower, of which the following is a full, clear, and exact description, reference being had to the accompanying drawings, forming part of this specification.

My invention relates more particularly to that class of mowers which are employed to cut the grass of lawns, terraces, and other ornamental grounds, and which are operated by hand-power, and it has for its object the construction of a mower in which the knife will be operated by both the forward and backward motion of the machine, to prevent clogging, and in which the cut grass will be readily discharged from the knife-bar, and in which the operating mechanism will be securely protected from injury, and may still be readily examined and cleaned or oiled, and in which the knife will be operated when the bar is raised at any angle from a horizontal position to a perpendicular, whereby the grass upon inclined terraces or upon the edges of walks or ditches may be cut without altering the position of the driving-wheel upon the ground; and my invention consists in the combination of devices hereinafter particularly described, and recited in the claim.

Figure 1 is a side elevation, and Fig. 2 a plan, of a lawn-mower embodying my invention, and Fig. 3 is a cross-section of the knife-bar.

A is the single driving-wheel. This is made with a broad rim, as shown, to permit a sufficiently firm support for the machine. This wheel is keyed upon an axle, $a$, and upon this same axle is fixed the large gear-wheel $b$. Upon a short axle, $a'$, are fixed the pinion $b'$, which engages the gear $b$, and also the miter-gear $c$, which engages the miter-pinion $c'$.

This latter pinion $c'$ is fixed on a short shaft, $d$, working in a sleeve-bearing, $d'$, and carries on its end the crank B. The frame or casing C incloses the gearing $b\ b'\ c\ c'$, and the axles $a$ and $a'$ have bearings therein, as shown, while the sleeve-bearing $d'$ is fixed thereto on its interior, and the shaft $d$, carrying the crank, extends through the casing, so that the crank B is upon the exterior thereof, as shown. The said case is entirely closed in on all sides, as shown, and has the lid $e$ hinged upon its top, and secured by a button, $e'$. By means of this case the gearing is kept free from clogging, and is protected from injury, and at the same time may be readily examined and repaired or oiled. The handle D is fixed upon this casing, as shown, and extends upward at an angle suitable for convenient operation.

Upon the side of the casing C is fixed an angle-arm, E, which extends around by the side and front of the crank B, thus acting as a guard to protect it from injury by sudden contact with obstructions. Upon the opposite side of the case, as shown, is fixed a lug, $f$. To this lug and the end of the angle-arm E is hinged the knife-bar F, by the arms $f'$, as shown. This bar carries the knife $g$, and is beveled off on its upper face from front to rear, as seen at $h$, Fig. 3. By means of this beveled upper face the grass cut by the knife is at once discharged from the bar and falls to the ground, thus preventing its accumulation about the knife and clogging it.

The crank B is united to the knife $g$ by the rod G, as shown. The pin which secures the rod to the crank should be sufficiently long to permit the easy play of the rod over the crank, when the knife-bar is raised above the horizontal position, and a suitable washer may be employed at this joint. The finger on the knife-bar which is nearest the joint of said bar with the rod G is preferably sufficiently far removed from the end of the bar to preclude the catching of the rod against it, when the said knife-bar is raised from the horizontal, or the said finger may be cut away somewhat at its base in the path of the rod-joint, as shown at $i$. An arm or supporting-brace, $j$, extends from the under side of the case C obliquely under knife-bar, to keep the said bar from falling below a horizontal position.

Now, it is evident that the knife will be operated by either the forward or backward movement of the machine, and thus the clogging of the knife after each forward cut be prevented; and also that the knife-bar may be raised from the horizontal position shown in Fig. 2, on its hinge-joint, to any inclined position up to the perpendicular one shown in Fig. 1, and the knife will be continuously operated, whereby the sides of hedges, or the borders of walks or inclined or perpendicular terraces, or the edges of ditches, may be cut and trimmed without altering the general position of the machine by tilting the driving-wheel from its level bearing upon the flat ground.

I do not claim, broadly, a lawn-mower having a single driving-wheel, nor one having a knife-bar, carrying a reciprocating knife and hinged to the machine and operated by a crank and rod, as I am aware these devices are not new. I intend to limit my claims herein to the specific devices shown and described, for the purposes specified.

What I claim as my invention, and desire to secure by Letters Patent, is—

In a lawn-mower, the broad-rimmed single driving-wheel A, axle $a$, gear-wheel $b$, pinion $b'$, miter-gear wheel $c$, miter-pinion $c'$, short shaft $d$, sleeve $d'$, casing C, with its lid $e$, crank B, guard angle-arm E, hinged knife-bar F, carrying-knife $g$, rod G, and support-brace $j$, as described.

RICHARD HUGHES.

Witnesses:
JAMES N. READING,
S. B. THOMAS.